SELECTIVE REMOTE POSITION CONTROL SERVOSYSTEM

Original Filed Oct. 3, 1960 2 Sheets-Sheet 1

INVENTORS
LAWRENCE M. LUNN
JAMES L. SHIELDS
JEAN C. DE VAULT
BY Thomas, Kisselman & Russell
ATTORNEYS

SELECTIVE REMOTE POSITION CONTROL SERVOSYSTEM

Original Filed Oct. 3, 1960 2 Sheets-Sheet 2

INVENTORS
LAWRENCE M. LUNN
JAMES L. SHIELDS
JEAN C. DE VAULT
BY Thomas, Weisman & Buell
ATTORNEYS United States Patent Office Re. 26,404
Reissued June 11, 1968

26,404

SELECTIVE REMOTE POSITION CONTROL SERVOSYSTEM

Lawrence M. Lunn, James L. Shields, and Jean C. De Vault, by Cornell-Dubilier Electric Corporation, Newark, N.J., a corporation of Delaware, assignee Original No. 3,043,998, dated July 10, 1962, Ser. No. 60,097, Oct. 3, 1960. Application for reissue Apr. 19, 1967, Ser. No. 647,883
6 Claims. (Cl. 318—29)

Matter enclosed in heavy brackets [ ] appears in the original patent but forms no part of this reissue specification; matter printed in italics indicates the additions made by reissue.

*ABSTRACT OF THE DISCLOSURE*

*An antenna rotator for television receivers, having relaying means controlling a motor and controlled by an A-C energized phase-sensitive bridge to adjust the position of the antenna to an optimum position for each channel, and including preset impedances one of which is selected by switching means in accordance with the selected channel, the position of the antenna being thus determined by the selected preset impedance.*

Figure 1:
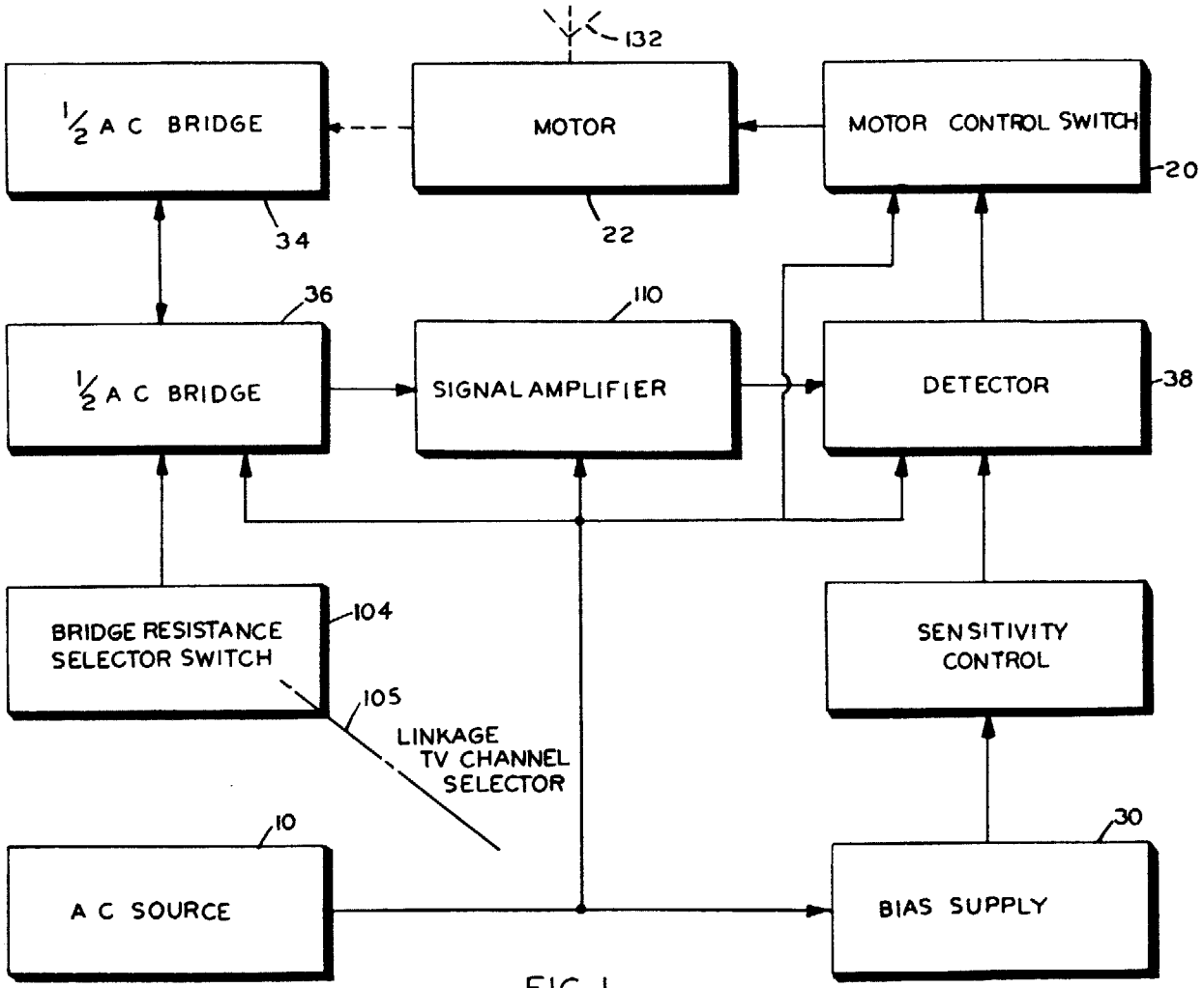

The present invention relates to an electromechanical control system for accurately and automatically positioning or repositioning a rotating device to any one of a plurality of predetermined azimuth settings, and has more particular reference to an improved control system for accurately and automatically positioning or repositioning an antenna to a predetermined azimuth setting.

There are presently used several methods in positioning a television antenna to a predetermined azimuth setting. In one method, the antenna is rotated independently of the step of selecting a channel on the television set. There may be provided a mechanical linkage for achieving the rotation of the antenna.

Another known method of achieving independent rotation of a television antenna, is to provide a manually controlled hydraulic control valve for a hydraulic rotor device to which the antenna is connected.

A further known method of providing independent rotation of a television antenna is by an electric motor used to rotate the antenna in which the motor is controlled for positioning to the best relative reception by an electric directional switch located in the vicinity of the television receiver.

This known arrangement may include a stepper switch controller for setting manually the desired relative direction or position of the antenna, and the controller trains the antenna to that position.

It has been found that each of the known methods is inaccurate and the best azimuth setting cannot be mechanically achieved on successive operations. Generally, the operator is usually required to physically observe the training of the antenna to assure that the best azimuth position is achieved.

Accordingly, the present invention is directed to a television receiver antenna which is automatically and accurately oriented and positioned by an electromechanical control system throughout the 360° rotation thereof on successive operations and in which the signal strength reception of any fixed radiating source is optimum, since the electromechanical control system of the invention accurately resets the position of the antenna to a preset position for reception of the optimum signal strength.

The invention also seeks to provide a novel electromechanical control system for positioning an antenna with respect to any of several fixed radiation sources for optimum signal strength reception.

Basically, the present invention provides a novel and improved electromechanical control system for a rotatable receiving antenna, in which the operation of the electromechanical control system may be coupled to a receiver channel selector and the control system is provided with a bridge circuit having an A.C. source connected thereto, one branch of the bridge circuit being adjusted by the relative position of said antenna and the other branch of said bridge circuit being adjusted by the position of said channel selector to unbalance the bridge circuit, a phase sensitive means responsive to the unbalance condition of the bridge circuit, a control means responsive to the phase sensitive means for detecting the amount of unbalance of the bridge circuit, and a motor operated by the control means for driving the antenna to a new position in which the branches of the bridge circuit are balanced and no unbalanced condition is present in the phase sensitive means.

Therefore, it is the object of the invention to provide an electromechanical control system in which a balanced condition in a bridge circuit is used to maintain an antenna in a receptive position and in which any unbalanced conditions are detected to reposition the antenna to a predetermined azimuth setting that balances the bridge circuit.

Figure 2:
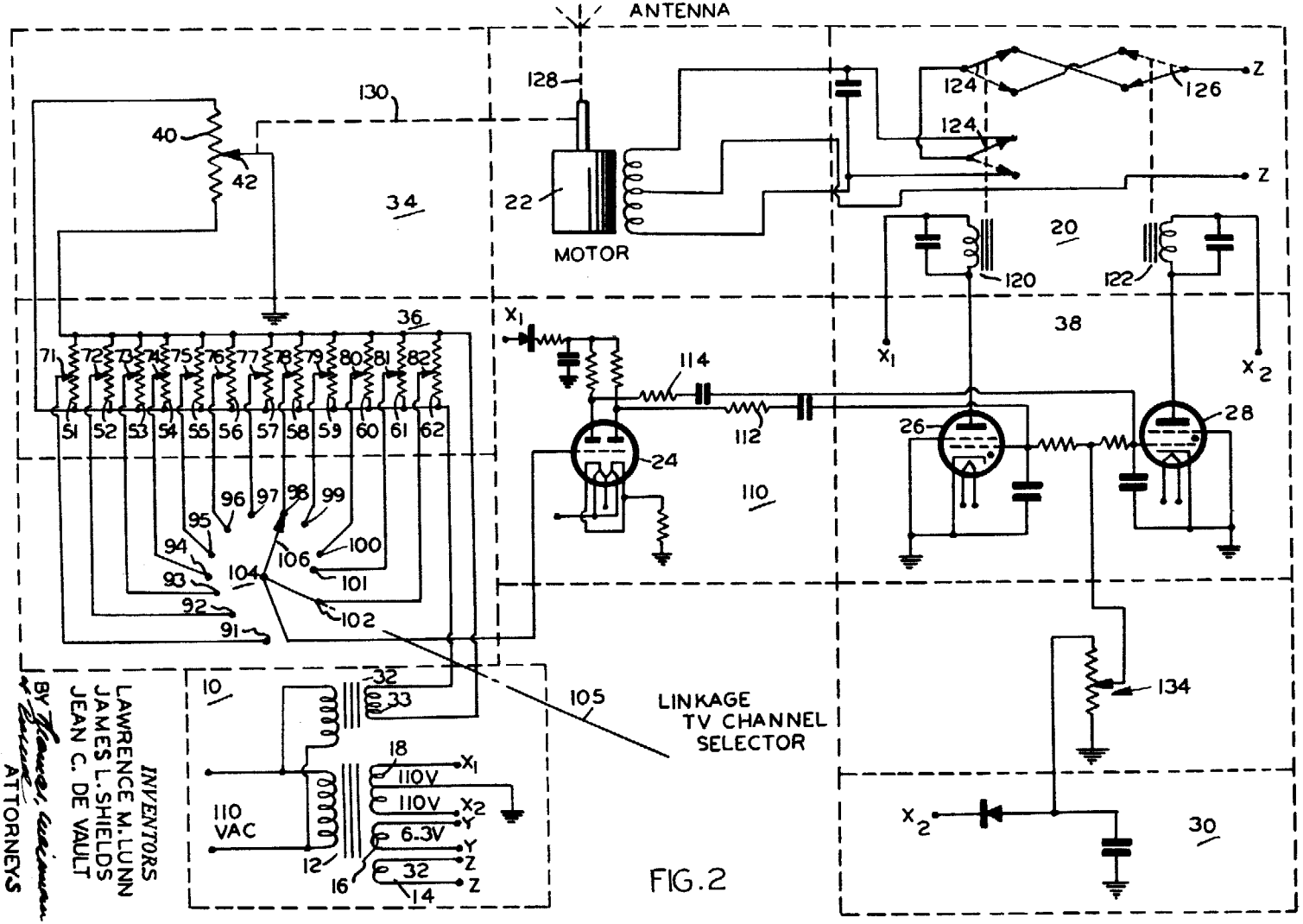

It is another object of the invention to provide a bridge circuit of the control system which includes impedance elements that may be adjusted to new values with respect to the balanced condition of the bridge circuit, and thus it is possible to adjust the balance of the bridge circuit so that new predetermined azimuth settings may be easily achieved A complete understanding of the invention may be had from the following description of a particular embodiment of the invention. In the description, reference is made to the accompanying drawings, of which:

FIGURE 1 is a block diagram of the electromechanical control system for repositioning a television receiving antenna in accordance with a preferred embodiment of the present invention; and FIGURE 2 is a detailed circuit diagram of the electromechanical control system of FIGURE 1.

Referring now to the drawings, an A.C. power source 10 is connected to the convenience outlet of a conventional television receiver (not shown) so that the power source 10 is electrically energized by the ON position of the off-on switch of the receiver.

The A.C. power source 10 includes a transformer 12 having secondaries 14 and 16 and having a grounded center-tapped secondary 18. The voltage induced in secondary 14 is applied through a motor control switch 20 to a rotor motor 22; the voltage induced in secondary 16 is sufficient to energize the filament circuits of tubes 24, 26, 28; and the voltage induced in the secondary 18 is a single phase alternating current supply for the plates of the tubes 24, 26, 28, as well as a supply for a bias supply 30.

The power source 10 includes a transformer 32 having a secondary 33 from which power is applied to an A.C. bridge circuit formed by a first branch 34 and a second branch 36.

The A.C. power source 10 is seen as a phase synchronizing reference and energy supply for both the A.C. bridge and a phase detector 38 formed by the circuit arrangement of tubes 26, 28. The A.C. power source 10 may be used for the motor 22, or any other convenient A.C. source suitable to the motor may be used.

The first branch 34 of the bridge circuit includes a potentiometer 40 having the ends thereof connected to the secondary 33 and the adjustable sliding contact 42 connected to ground.

The second branch 36 of the bridge circuit comprises a parallel arrangement of a plurality of potentiometers 51, 52, 53, 54, 55, 56, 57, 58, 59, 60, 61, 62, each having adjustably preset contacts 71, 72, 73, 74, 75, 76, 77, 78, 79, 80, 81, 82. The number of potentiometers 51 to 62 is equal to the number of receivable channels of the television receiver (not shown).

The adjustably preset contacts 71 to 82 are connected to respective contacts 91 to 102 of a bridge resistance selection switch 104. The switch has a rotatable switching element 106 connected by mechanical coupling 105 to a tuner or channel selector switch (not shown) of the receiver. In this way, the channel selector switch is set manually to a desired channel and the related potentiometer 51 to 62 has its adjustably preset contact connected through the bridge resistance selection switch 104. Initially, the contacts 71 to 82 have been preset by adjustment until optimum reception is obtained in the receiver by the position of the antenna.

The channel selection switch and the bridge resistance selection switch 104 are set to another channel and the respective potentiometer is adjusted for optimum reception in the receiver. Once the potentiometers are each adjusted to correspond with an appropriate desired position of the antenna, then selection of a desired channel by the channel selector switch automatically positions the antenna for optimum strength reception by the unbalanced condition of the bridge establishing an A.C. signal voltage output of the bridge circuit. The output of the bridge circuit may be of insufficient amplitude, so it is fed to a grid of tube 24 of a signal amplifier 110. The amplified signal is taken from the plates of the tube 24 and applied respectively and simultaneously to the control grids of thyratron tubes 26 and 28 which form a portion of a phase detector 38 through coupling network 112, 114.

The plates of the thyratron tubes 26, 28 receive their plate energy from secondary 18, one plate being out-of-phase with the other to provide a reference for phase difference detection.

The direction in which the bridge circuit is unbalanced determines which thyratron tube 26, 28 has a signal applied to its respective grid in an in-phase condition. The in-phase condition exists when a thyratron tube has both the plate and the grid thereof energized positive with respect to the cathode, the cathode being tied directly to ground. As a result of the positive in-phase condition, the thyratron tube conducts or fires to cause sufficient current flow in its plate circuit to energize the respective relay 120, 122 in its plate circuit forming a portion of the motor control switch 20.

The other thyratron tube will have a negative plate voltage and a positive grid voltage, or a positive plate voltage and a negative grid voltage thereon, and will not fire to energize its circuit connected relay.

The relays 120, 122 control respective contact switches 124, 126 energized by the secondary 14 to thereby apply the desired phased energy to the rotor motor 22.

The shaft of the rotor motor 22 is directly coupled, or coupled through desired gear reducing means (not shown), to an antenna shaft 128 to rotate an antenna 132. As the antenna is rotated by the motor 22, a mechanical coupling 130 tied to the antenna shaft 128 adjusts or moves the sliding contact 42 along the potentiometer 40 until a null condition exists in the branches 34, 36 of the bridge circuit.

In the event the other thyratron tube had fired, the opposite direction of rotation of the antenna shaft 128 and movement of contact 42 would be obtained until the balance of the branches 34, 36 of the bridge circuit is achieved.

After the bridge circuit achieves the null or balanced condition, there no longer is any unbalanced condition to establish a signal to trigger either of the thyratron tubes 26, 28, and the antenna remains in the position, which position is the optimum position for signal reception of the receiver as has been preset in the adjustment of potentiometers 51 to 62.

In order to optimize the stability of the phase detector 38, the thyratron tubes are biased considerably more negative than the breakdown point for selected A.C. plate voltage so that there must be substantial or discernible input signals applied to the grids of the tubes 26, 28 to render them conductive. The required bias for this purpose is obtained from a bias supply 30 connected to secondary 18 and is controlled in magnitude by a sensitivity control potentiometer 134.

It is, of course, within the contemplation of the present invention to use any appropriate types of thyratron tube for those shown in FIGURE 2. A transformer may be conveniently used to replace the amplifier 110 and transistors may be substituted for any or all of the tubes 24, 26, 28. Also, saturable transformers may be conveniently substituted to replace the tubes.

Additional embodiments of the invention in this specification will occur to others and therefore it is intended that the scope of the invention be limited only by the appended claims and not by the embodiment described hereinabove. Accordingly, reference should be made to the following claims in determining the full scope of the invention.

What is claimed is:

1. A remote control antenna positioning system for a television receiver having a channel selector and a rotating television receiving antenna comprising an A.C. source of current supply, a bridge circuit having said A.C. source connected thereto, a first branch of said bridge circuit having a variable impedance element varied by the relative position of said receiving antenna, a second branch of said bridge circuit being preselectedly adjusted by the position of said channel selector of said receiver, phase sensitive means connected to the output of the bridge circuit and responsive to the unbalance of current in said bridge circuit, relay control means connected to the phase sensitive means for detecting the amount of unbalance of current in said bridge circuit, a motor connected to the relay control means for rotating said receiving antenna and adjusting the variable impendance element until the bridge circuit is rebalanced.

2. A remote control antenna positioning system including a position selector switch for a rotatable television receiver antenna comprising an A.C. source of current supply, a bridge circuit having said A.C. source connected thereto, a first branch of said bridge circuit having its impedance value adjusted by the relative position of said receiver antenna, a second branch of said bridge circuit having its impedance value adjusted by the position of said position selector switch, phase sensitive means connected to the bridge circuit and responsive to the unbalance of current in said bridge circuit, control means connected to the phase sensitive means for detecting the amount of unbalance of current in said bridge circuit, a motor connected to the control means for rotating said receiving antenna and adjusting the impedance of said first branch until the bridge circuit is rebalanced, and a bias control means to adjust the action of operability of the phase sensitive means.

*3. A remote control antenna positioning system for a television receiver having a channel selector and a rotating television receiving antenna comprising an A.C. source of current supply, a selector switch coupled to and operable coordinately with said channel selector, plural individually adjustable pre-set impedances connected to said selector switch and selected thereby, a bridge circuit having said A.C. source connected thereto, a first branch of said bridge circuit having a variable impedance element varied by the relative position of said receiving antenna, a second branch of said bridge circuit including one of*

*said pre-set impedances selected by said selector switch and thus being preselectedly adjusted by the position of said channel selector of said receiver, phase sensitive means connected to the output of the bridge circuit and responsive to the unbalance of current in said bridge circuit, relay control means connected to the phase sensitive means for detecting the amount of unbalance of current in said bridge circuit, a motor connected to the relay control means for rotating said receiving antenna and adjusting the variable impedance element until the bridge circuit is rebalanced.*

*4. A remote control antenna positioning system for a television receiver having a channel selector of said receiver and including a position selector comprising plural pre-set individually adjustable impedances, a rotating television receiving antenna comprising an A.C. source of current supply, a bridge circuit having said A.C. source connected thereto, a first branch of said bridge circuit having a variable impedance element varied by the relative position of said receiving antenna, a second branch of said bridge circuit including one of said pre-set impedances and thereby being preselectedly adjusted by the position of said position selector in accordance with the position of the channel selector, phase sensitive means connected to the output of the bridge circuit and responsive to the unbalance of current in said bridge circuit, relay control means connected to the phase sensitive means for detecting the amount of unbalance of current in said bridge circuit, a motor connected to the relay control means for rotating said receiving antenna and adjusting the variable impedance element until the bridge circuit is rebalanced.*

*5. A remote control antenna positioning system for a television receiver having a channel selector and a rotating television receiving antenna comprising selective switching means and plural individually adjustable pre-set impedances selected by said switching means, an A.C. source of current supply, a bridge circuit having said A.C. source connected thereto, a first branch of said bridge circuit having a variable impedance element varied by the relative position of said receiving antenna, a second branch of said bridge circuit comprising a pre-set impedance selected by said selective switching means and thereby being preselectedly adjusted in accordance with the position of said channel selector of said receiver, phase sensitive means connected to the output of the bridge circuit and responsive to the unbalance of current in said bridge circuit, relay control means connected to the phase sensitive means for detecting the amount of unbalance of current in said bridge circuit, a motor connected to the relay control means for rotating said receiving antenna and adjusting the variable impedance element until the bridge circuit is rebalanced.*

*6. A remote control antenna positioning system including a position selector switch for a rotatable television receiver antenna comprising an A.C. source of current supply, plural individually adjustable pre-set impedances connected to said position selector switch for selection thereby, a bridge circuit having said A.C. source connected thereto, a first branch of said bridge circuit having its impedance value adjusted by the relative position of said receiver antenna, a second branch of said bridge circuit comprising one of said pre-set impedances and thus having its impedance value adjusted by the position of said position selector switch, phase sensitive means connected to the bridge circuit and responsive to the unbalance of current in said bridge circuit, control means connected to the phase sensitive means for detecting the amount of unbalance of current in said bridge circuit, a motor connected to the control means for rotating said receiving antenna and adjusting the impedance of said first branch until the bridge circuit is rebalanced, and a bias control means to adjust the action of operability of the phase sensitive means.*

References Cited

The following references, cited by the Examiner, are of record in the patented file of this patent or the original patent.

UNITED STATES PATENTS

| | | | |
|---|---|---|---|
| 2,830,244 | 4/1958 | Davis | 318—207.5 |
| 2,671,877 | 3/1954 | Stewart | 318—29 |
| 2,725,519 | 11/1955 | Malick et al. | 318—29 |
| 2,443,347 | 6/1948 | Field | 318—29 |
| 2,790,121 | 4/1957 | Martin | 318—33 |
| 2,535,147 | 12/1950 | Markusen | 318—207.54 |
| 2,796,567 | 6/1957 | Boode | 318—207.54 |
| 2,889,507 | 6/1959 | Kennedy et al. | 318—29 |
| 2,914,717 | 11/1959 | Redding | 318—29 |
| 2,944,202 | 7/1960 | Bonacorsi | 318—29 |

ORIS L. RADER, *Primary Examiner.*

T. E. LYNCH, *Examiner.*